Dec. 26, 1950 E. L. C. WHITE ET AL 2,535,471

TELEVISION TRANSMITTER SWITCHING APPARATUS

Filed Feb. 12, 1947

INVENTORS
ERIC L. C. WHITE
FRANK R. TROTT
BY H. S. Grover
ATTORNEY

Patented Dec. 26, 1950 2,535,471

UNITED STATES PATENT OFFICE 2,535,471

TELEVISION TRANSMITTER SWITCHING APPARATUS

Eric Lawrence Casling White, Iver, and Frank Runcorn Trott, Burnham, England, assignors to Electric & Musical Industries Limited, Hayes, England, a company of Great Britain Application February 12, 1947, Serial No. 728,120
In Great Britain January 15, 1946

Section 1, Public Law 690, August 8, 1946
Patent expires January 15, 1966

5 Claims. (Cl. 179—7.1)

This invention relates to television apparatus.

In transmitting television programmes it is frequently desired to change from one scene to another and for this purpose the output of one television camera is switched from the transmitter and replaced by the output from another camera. Usually such change is effected by fading out the output from one camera and by fading in the output from the other camera. In some cases, however, it may be desired to effect an instantaneous switch from one camera to another, but heretofore such an instantaneous switch has usually resulted in an unsightly splash on the screen of a television receiver owing to the fact that momentarily one part of a frame scan will appear to be occupied by the scene from one camera and the remainder by the scene from the other camera. Similar difficulties also arise in cases where it may be desired to vary the level of television signals, in discrete steps.

The object of the present invention is to provide improved apparatus whereby such rapid changes in television signals can be effected.

According to the present invention there is provided television apparatus wherein means are provided whereby rapid changes in television signals, such as an instantaneous switch from one camera to another or a rapid change in the level of said signals can only be effected in the intervals between successive frame scans.

The apparatus may comprise a switching device for effecting said rapid changes, means under the control of an operator for controlling the operation of said switching device, and further means for effecting a further control on said switching device, said further means being synchronised with said intervals whereby said switching device can only be operated to cause said changes when said further control is effected.

Figure 1:
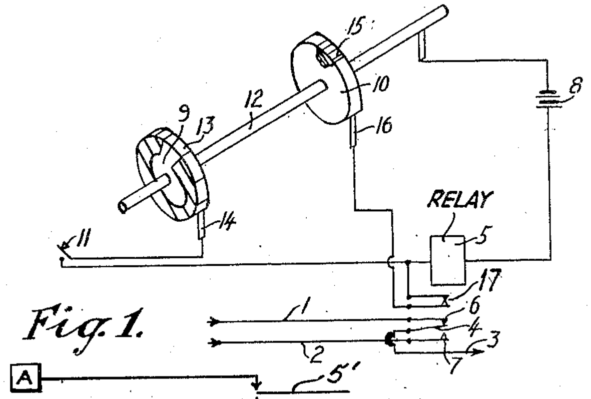
Figure 2:
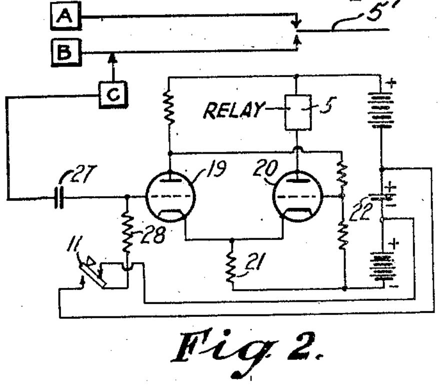
Figure 3:
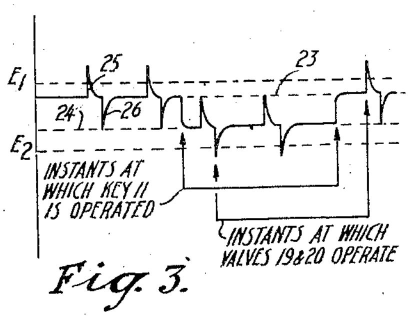
Figure 4:
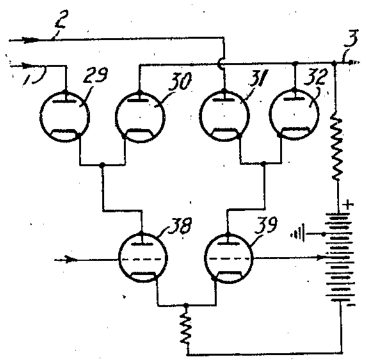
Figure 5:
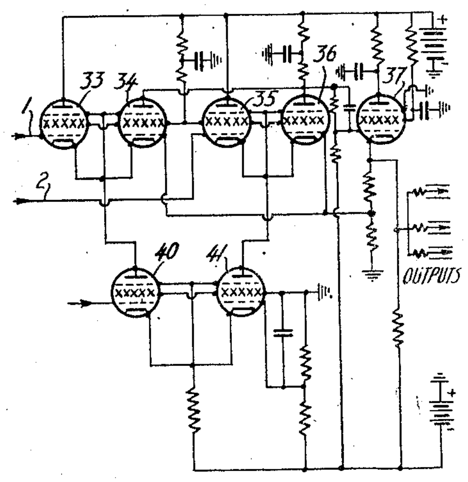

In order that the said invention may be clearly understood and readily carried into effect, it will now be more fully described with reference to the accompanying drawings, in which:

Figure 1 is a diagrammatic view of a mechanical commutator device for use in carrying out the invention, Figure 2 is a circuit diagram of a thermionic valve arrangement for use in place of the commutator device shown in Figure 1, Figure 3 illustrates the waveform of pulses suitable for application to the arrangement shown in Figure 2, Figure 4 is a circuit diagram illustrating an arrangement in which the mechanical switches shown in Figure 1 are replaced by thermionic valves, and Figure 5 is a modification of the arrangement shown in Figure 4.

In Figure 1 of the drawings the output from one television camera may be fed along a channel 1 and the output from another camera along the channel 2, the channels 1 and 2 being alternately switched under the control of the operator to feed the output from either channel 1 or 2 to the signal output channel 3. Switching of the channel 1 or 2 to the channel 3 is effected in Figure 1 by the operation of a contact 4 which is controlled by a relay 5 which causes said contact 4 to engage either of a pair of contacts 6 and 7 connected respectively to channels 1 and 2. The relay 5 is energised by a source of current indicated at 8, the circuit to the relay 5 being closed via a pair of commutators 9 and 10 under the control of a manually-operated key 11. The commutators 9 and 10 are mounted on a shaft 12 which is driven synchronously at the frame frequency and the comuntator 9 is provided with a conducting segment 13 so that the commutator 9 can only make contact with its associated brush 14 during the intervals between successive frame scans, whilst the commutator 10 is provided with an insulated segment 15 so that it makes contact with its associated brush 16 at all times except during the intervals between successive frame scans. The brush 16 is arranged in series with relay-holding contacts 17 whereby the relay 5 can be held energised when the brush 16 engages the conducting portion of the commutator 10. Assuming that the commutators are in the position shown in Figure 1 and assuming that the key 11 is depressed in order to effect an instantaneous switch from one camera to another, the relay 5 will not operate to change the position of the contact 4 until the commutator 9 has rotated to a position in which the conducting segment 13 makes contact with the brush 14, that is to say, until the interval which occurs after the frame scan during which the key 11 was depressed. When the conducting segment 13 moves out of engagement with the brush 14 the relay 5 will remain in its energised condition through current supplied to the relay from the brush 16 and the conducting portion of the commutator 10. When it is desired to effect a further instantaneous switch the key 11 is opened and the relay 5 will remain in its energised position through the self-hold contacts 17 until the non-conducting segment 15 again engages the brush 16 when the relay 5 will be de-energised.

The mechanical commutators shown in Figure 1 may be replaced by a pair of thermionic valves, as shown in the circuit of Figure 2. In this figure a pair of thermionic valves 19 and 20 are provided, the cathodes of which are coupled together and to the negative pole of a source of supply via a resistance 21 whilst the anode of the valve 19 is connected to the control electrode of the valve 20 as indicated, the arrangement forming in known manner a so-called "flip-flop" circuit which has two stable conditions in one of which the valve 19 is conducting and in the other of which the valve 20 is conducting. The relay 5 is arranged in the anode circuit of the valve 20 and current is supplied to the valves as conventionally indicated by the batteries shown in Figure 2. With a circuit as shown in Figure 2, a change from one condition to the other can be effected by varying the bias potential applied to the control electrode of the valve 19 until it reaches a critical potential. With a circuit as shown in Figure 2, there are two critical potentials corresponding to the two stable conditions. The bias potential of the control electrode of the valve 19 is changed by operating the key 11 which serves to connect the positive or negative end of a bias battery 22 to the control electrode of the valve 19 according to the position of the key 11. The change of potential applied to the control electrode of valve 19 on operation of the key 11 is arranged to be less than that required to change the condition of the circuit from one state to the other and, in addition to this change in potential, pulses are applied to the control electrode of the valve 19, these pulses occurring during the intervals between successive frame scans so that if the key 11 is operated a change in stable condition of the valves 19 and 20 will not be effected until a pulse is applied to the control electrode of the valve 19. Referring to Figure 3 of the drawings, the dotted lines 23 and 24 indicate the bias potentials applied to the control electrode of the valve 19 from the battery 22 when the key 11 is operated, these bias potentials being restricted to, say, half the difference between the two critical potentials $E_1$ and $E_2$ so that if merely the key 11 were operated without pulses being present on the control electrode of the valve 19, no change in the stable condition would occur. The waveform of pulses suitable for application to the control electrode of the valve 19 is indicated by full lines in Figures 3, these pulses comprising positive portions 25 and negative portions 26 each of which has an amplitude substantially equal to half the difference between the critical potentials, so that if the key 11 is operated then a change in the stable condition of the valves 19 and 20 will occur immediately following the application of either a positive or negative pulse depending on the position of the key 11. With the key 11 in the position shown in Figure 2, in which position a negative bias is applied to the control electrode of the valve 19, the valves 19 and 20 will change from one state to the other when the first negative pulse occurs and with the key 11 depressed in which position a positive bias is applied to the control electrode of the valve 19 the valves will change from one condition to the other when the next positive pulse occurs. The rectangles indicated by letters A and B represent two pick-up devices one or the other of which is connected to the output channel by operation of relay 5 on switch number 5'. The rectangle indicated by the letter C represents a conventional apparatus for production of rectangular waves.

The positive and negative pulses 25 and 26 should occur closely following one another leaving sufficient time after the occurrence of the second of the pair of pulses for the relay 5 to operate before the end of the interval between successive frame scans. The pulses 25 and 26 may be produce, for example, by differentiating a single short rectangular pulse by feeding said rectangular pulses to a differentiating circuit comprising condenser 27 and resistance 28 connected to the control electrode of the valve 19, the time constant of the condenser 27 and resistance 28 being short compared with the duration of each rectangular pulse. If desired, instead of providing said positive and negative pulses closely following one another, positive and negative pulses may be employed which occur alternately in the intervals between successive frame scans.

Instead of employing the relay 5 for effecting switching from one camera channel to the other, the relay 5 may be replaced by two pairs of diode valves 29, 30 and 31, 32 as indicated in Figure 4. The camera channels 1 and 2 are connected to the anode of diode 29 and to the anode of diode 31 respectively, the diodes operating to switch the output of either channel 1 or 2 to the signal output channel 3 in a manner described in the specification of British Patent No. 497,637. The arrangement in Figure 4 is suitable for feeding the signal output to a high impedance load, such as the control electrode of a subsequent valve. If it is desired to feed the signal output to a low impedance load, then the diode valves 29, 30 and 31, 32 may be replaced by pairs of triode or pentode valves 33, 34 and 35, 36 as shown in Figure 5. The valves 33, 34 and 35, 36 form part of an amplifier circuit the output from which is fed into a cathode follower valve 37 as described in the specification of British Patent No. 564,821.

In Figure 4 the diode valves 29 . . . 32 are coupled as shown to the anodes of a pair of cathode-coupled triodes 38 and 39, the control electrode of the valve 38 being connected to the anode of the valve 19 of Figure 2 so that the valves 38 and 39 will operate when a change in the stable condition of the valves 19 and 20 occurs. Similarly, in Figure 5 of the drawings, the cathodes of the pentode valves 33 . . . 36 are coupled to the anodes of a pair of cathode-coupled pentode valves 40 and 31, the control electrode of the valve 40 being also connected to the anode of the valve 19 of Figure 2. If desired, however, the valves 38, 39 and 40, 41 can be omitted and the valves 19 and 20 employed in their stead.

We claim:

1. A television transmitter system including a plurality of pick-up devices for individually producing a corresponding plurality of video signals and wherein all of the pick-up devices are operated synchronously to simultaneously scan target electrodes contained therein in a succession of frame scanning cycles and a single transmission channel for the transmission of only one of the produced plurality of video signals at any time, comprising switching means for selectively connecting the transmission channel to a desired one of the pick-up devices, said switching means being adapted to be manually conditioned for operation, and means for confining the actual switching operation to intervals between successive frame scanning cycles.

2. A television transmission system including a plurality of sources of television video signal trains, each source supplying video signals interspersed with concomitantly occurring blanking intervals, a single transmission channel, means for applying one or another of the video signal trains to the transmission channel comprising a manually operated initiating circuit and a final switching circuit, and means for actuating the final switching circuit during the next succeeding blanking interval following the instant of operation of the initiating circuit.

3. A switching circuit for connecting a single television transmission channel to one or another of a plurality of synchronously operated television cameras comprising a manually operated selection means for selecting the desired camera, a source of recurring impulses related to the synchronous operation of the cameras, and means responsive to the selection means and the recurring impulses to effect final switching of the cameras only during the vertical blanking periods of the scanning cycles.

4. A television transmission system including a plurality of sources of television video signal trains, each source supplying video signals interspersed with concomitantly occurring vertical blanking intervals, a single transmission channel, means for applying one or another of the video signal trains to the transmission channel comprising a thermionic switching circuit having two stable conditions, means for changing a control potential under the control of an operator from either one or the other of two values to condition the switching circuit for operation, a series of impulses each occurring substantially simultaneously with the concomitant blanking intervals, and means responsive to the next succeeding impulse following the manual conditioning of the switching circuit for effecting a final switching.

5. In a television system having a plurality of video pick-up devices, a switch for selectively applying the output of any one of said pick-up devices to a common transmission channel comprising a device having a plurality of operative positions, circuit arrangements for connecting the output of one of said pick-up devices to said channel in each position, means for selectively conditioning said device for a change from one operative position to a predetermined operative position, means for periodically blanking the output of each of said pick-up devices, and means for changing said device from said one operative position to the predetermined operative position for which it was conditioned during the time the pick-up devices connected to the initial position and the predetermined position are blanked out.

ERIC LAWRENCE CASLING WHITE.
FRANK RUNCORN TROTT.

REFERENCES CITED

The following references are of record in the file of this patent:

UNITED STATES PATENTS

| Number | Name | Date |
|---|---|---|
| 1,870,352 | Watson | Aug. 9, 1932 |
| 2,000,694 | Felix | May 7, 1935 |
| 2,107,464 | Zworykin | Feb. 8, 1938 |
| 2,116,549 | Zenner | May 10, 1938 |
| 2,359,449 | Shelby | Oct. 3, 1944 |

FOREIGN PATENTS

| Number | Country | Date |
|---|---|---|
| 325,362 | Great Britain | Feb. 20, 1930 |